(12) United States Patent
Airola et al.

(10) Patent No.: US 6,617,417 B1
(45) Date of Patent: Sep. 9, 2003

(54) UNSATURATED POLYESTER RESIN COMPOSITIONS

(75) Inventors: Karri Airola, Porvoo (FI); Outi Färm, Helsinki (FI); Paul Mahbub, Porvoo (FI); Eija Valtonen, Porvoo (FI)

(73) Assignee: Ashland, Inc., Covington, KY (US)

( * ) Notice: Subject to any disclaimer, the term of this patent is extended or adjusted under 35 U.S.C. 154(b) by 0 days.

(21) Appl. No.: 09/889,951

(22) PCT Filed: Feb. 2, 2000

(86) PCT No.: PCT/FI00/00070
§ 371 (c)(1),
(2), (4) Date: Jan. 31, 2002

(87) PCT Pub. No.: WO00/46297
PCT Pub. Date: Aug. 10, 2000

(30) Foreign Application Priority Data

Feb. 2, 1999 (FI) .................................................. 990189

(51) Int. Cl.⁷ .............................................. C08G 63/02
(52) U.S. Cl. ................ 528/272; 428/411.1; 428/423.5; 428/423.7; 528/271
(58) Field of Search ................ 528/272, 271; 428/411.1, 423.7, 423.5

(56) References Cited

U.S. PATENT DOCUMENTS

| 5,360,863 A | 11/1994 | Meixner et al. |
| 5,470,897 A | 11/1995 | Meixner et al. |
| 5,703,198 A | 12/1997 | Twigt et al. |

FOREIGN PATENT DOCUMENTS

| DE | 197 11 410 A1 | 9/1998 |
| EP | 0 322 808 A2 | 7/1989 |
| EP | A20322808 | 7/1989 |
| EP | A10582909 | 2/1994 |
| EP | 0 636 669 A2 | 2/1995 |
| EP | A20636669 | 2/1995 |
| JP | A7216033 | 8/1995 |
| WO | WO 90/01512 | 2/1990 |
| WO | WO 92/14764 | 9/1992 |
| WO | A19214764 | 9/1992 |
| WO | WO 98/23683 | 6/1998 |
| WO | WO 98/56865 | 12/1998 |
| WO | A19856865 | 12/1998 |
| WO | WO 99/54403 | 10/1999 |
| WO | A19954403 | 10/1999 |

OTHER PUBLICATIONS

Froehling, Peter E., "Crosslinking of unsaturated polyester...," Journal of Applied Polymer Science, (1982) vol. 27, pp. 3577–3584.
Coating, Inks et al., "Vinyl ethers as alternatives to styrene...," Res. Discl., (1994) vol. 368, p. 692–693.
Coating, Inks et al, Res. Discl., vol. 368, pp. 692–693 (1994).
Froehling, Journal of Applied Polymer Science, vol. 27, pp. 3577–3584 (1982).

*Primary Examiner*—Terressa M. Boykin
(74) *Attorney, Agent, or Firm*—Birch, Stewart, Kolasch & Birch, LLP

(57) ABSTRACT

The invention relates to unsaturated polyester resins and more particularly polyester resin compositions curable at room temperature and comprising divinyl ethers. Unsaturated polyester resin compositions in accordance with the invention comprise 50–90 wt. % of at least one normal and/or one modified unsaturated polyester, not more than 30 wt. % of styrene, not more than 20 wt. % of at least one monofunctional and/or one multifunctional monomer, and 0.1–40 wt. % of at least one divinyl ether.

13 Claims, No Drawings

UNSATURATED POLYESTER RESIN COMPOSITIONS

This application is the national phase under 35 U.S.C. §371 of PCT International Application No. PCT/FI00/00070 which has an International filing date of Feb. 2, 2000, which designated the United States of America and was published in English.

The invention relates to unsaturated polyester resins and more particularly polyester resin compositions curable at room temperature and comprising divinyl ethers, which compositions are specially suitable for gelcoats, lamination resins and applications where thicker layers of the product are required.

Various vinyl and divinyl ethers have been used as monomer replacing agents in different polyester formulations of the state of the art. A benefit which is achieved by using vinyl ethers, is the replacement of more harmful monomers with non-hazardous vinyl compounds, which are sufficiently reactive under appropriate curing conditions and which can be cured as part of the finished product. One of the major problems relating to the applicability of these resin compositions in normal unsaturated polyester resin concerns curing. In most of the examples presented in literature, the resins can be cured only by radiation. U.S. Pat. No. 5,360, 863 describes the use of vinyl ethers as an alternative to acrylates and methacrylates in radiation curable unsaturated polyester compositions. This publication discloses the replacing of volatile monomers like styrene or low molecular weight methacrylates/acrylates by vinyl ethers but the compositions presented in the patent are only radiation curable. Similarly, EP patent 322 808 describes the use of divinyl ethers with ethylenically unsaturated polyesters in radiation curable compositions. An additional feature of the invention in this publication is to allow divinyl ether to react to iso-cyanates in order to obtain vinyl ether modified polyurethane intermediates. WO 90/01512 describes more generally the use of vinyl ethers in photo-curable compositions.

Curing by radiation sets great limitations for vinyl ether compounded polyesters in applications, such as construction, because the versatility of applications and the thickness of moulded layers are significantly limited. Moulds of larger size are difficult or impossible to expose to any radiation and even if the moulded parts could be cured by radiation, radiation does not penetrate the thick layers of reinforced materials. For the above mentioned reasons the typically used unsaturated polyester formulations containing vinyl ethers are suitable only for UV (ultra violet) or EB (electron beam) curable coatings.

EP application 0582909 discloses at room temperature radical curable compositions specially suitable for thin films and coatings of approx. 90 μm thickness which compounds comprise unsaturated polyesters based on unsaturated dicarboxylic acids and unsaturated glycolic oxalkylated 2-buten-1,4-diols, and (meth)acrylates. Compounds with vinyl ether groups may also or alternatively used. By using the unsaturated glycolic components the density of unsaturation is raised thus increasing the total reactivity of the polyesters sufficient for thin coatings. Additionally the compositions comprise known additives. DE application 19711410 discloses compositions for impregnation, filling and coating of electrotechnical and electronic building parts and for impregnation or isolation materials. The composition which is suitable for impregnation and for coating with thin films, comprises a polyester component A1) which contains as building blocks dihydrodicyclopentadienyl units and/or oligo-dihydrodicyclopentadienyl units, a vinyl ether component (A2) and an additional polymer component (A3) and other additives. These dicyclopentadienyl based polyester resins are cured by methods requiring photo-initiation or thermal initiation followed by curing at elevated temperatures or under radiation.

Thus, there clearly exists a need for unsaturated polyester resin compositions for gelcoats, for lamination purposes and for composites which compositions comprise vinyl ethers and which are curable at room temperature under normal conditions.

An object of the present invention is to provide unsaturated polyester resin compositions which comprise divinyl ethers and which compositions are curable under normal conditions at room temperature. A further object of the present invention is to provide a method for the manufacture of such polyester resin compositions, and a still further object of the invention is the use of said compositions.

The characteristic features of the unsaturated polyester resin compositions comprising divinyl ethers, the method for the manufacture thereof and the use thereof are set forth in the claims.

In accordance with the invention, the unsaturated polyester resin composition comprises at least one unsaturated polyester and at least one divinyl ether, and the curing of the composition may be conveniently performed with radical curing such as peroxide initiator systems under normal curing conditions at room temperature. The curing may be enhanced by using in the formulation a portion of at least one modified polyester such as methacrylate or acrylate modified polyester, and optionally a catalytic amount of a copromoter. Various divinyl ethers or mixtures thereof may be used for partly or totally replacing of monomers, in particular harmful monomers, such as styrene, in unsaturated polyester resin compositions.

The unsaturated polyester resin compositions comprising divinyl ethers are compounded of at least one and preferably two to four unsaturated polyester. Suitable starting materials for the manufacture of normal or modified unsaturated polyesters are listed in the following. As sources of unsaturation, ethylenically unsaturated acids such as maleic acid, fumaric acid, maleic anhydride, derivatives thereof or mixtures thereof are used in an amount of at least 10 mol-%, preferably at least 20 mol-%. As other acids may be used benzoic acid, phthalic acid, phthalic anhydride, isophthalic acid, terephthalic acid, terephtalic anhydride, adipic acid, 1,2-cyclohexyl dicarboxylic acid and 1,4-cyclohexyl dicarboxylic acid. For replacing partially or totally the said ethylenically unsaturated acids, optionally methacrylic acid or acrylic acid may be used in an amount of not more than 40 mol-% and preferably not more than 30 mol-% calculated from the amount of all components, for raising the degree of unsaturation and the reactivity of the polyester resin.

Suitable alcohols required as other components in the unsaturated polyester are monoalcohols, diols, triols, aliphatic alcohols and aromatic alcohols. Preferred saturated aliphatic diols and triols have a general formula (I)

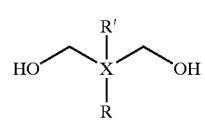

(I)

wherein

X is $C_1-C_4$, $(CH_2-CH_2-O)n$ or

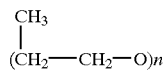

and n=1,2,3;

R is H, $-CH_2OH$, $-CH_3$, $-CH_2CH_3$, $-CH_2CH_2CH_3$ or $-CH_2CH_2CH_2CH_3$ and R' is H, $-CH_2OH$, $-CH_3$, $-CH_2CH_3$, $-CH_2CH_2CH_3$ or $-CH_2CH_2CH_2CH_3$.

Particularly preferred alcohols are 2-ethyl hexanol, benzyl alcohol, 2-phenylethyl alcohol, ethylene glycol, diethylene glycol, dipropylene glycol, 1,2-propylene glycol, 1,3-propylene glycol, 1,4-butane diol, 2-methyl-1,3-propane diol, neopentyl glycol, 2-butyl-2-ethyl-1,3-propane diol, 1,6-hexane diol, trimethylol propane and tri-methylol ethane.

The alcohols may also be partly replaced by glycidyl compounds in order to obtain low molecular weight methacrylate or acrylate modified or terminated polyesters. Suitable glycidyl compounds are glycidyl methacrylate and glycidyl acrylate. At most 80 mol-% of alcohols can be replaced by glycidyl compounds and preferably not more than 60 mol-%.

The ratio of acids to alcohols generally used in polyesters of the state of the art may be applied.

The resins are processed in conventional reactors for polyesters until an acid value of 5–65 is reached and excess water is removed during the reaction. During the addition of endcappers, if any, which here refer to glycidyl compounds, the reaction temperature may be decreased, if necessary.

The unsaturated polyester resin composition in accordance with the invention containing divinyl ether comprises:

50–90 wt-%, preferably 58–80 wt-% of at least one, preferably two to four normal unsaturated polyester and/or modified unsaturated polyester;

not more than 30 wt-%, preferably not more than 20 wt-% of styrene;

not more than 20 wt-%, preferably not more than 15 wt-% of at least one monofunctional and/or one multifunctional monomer, such as a derivative of acrylic or methacrylic acid, such as methyl methacrylate, butyl acrylate, ethylhexyl acrylate, hydroxypropyl methacrylate, lauryl acrylate, stearyl methacrylate, lauryl methacrylate, butanediol diacrylate, ethyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate or trimethylol propane triacrylate, pentaerythritol 3-acrylate, pentaerythritol tetra-acrylate or a vinylic derivative such as divinyl benzene, α-methyl styrene, o-methyl styrene or p-methyl styrene;

0.1–40 wt-%, preferably 5–40 wt-% of at least one divinyl ether, preferably tri-ethylene glycol divinyl ether, diethylene glycol divinyl ether, 1,4-cyclohexane dimethylol divinyl ether, dipropylene glycol divinyl ether, tripropylene glycol divinyl ether, 1,6-hexanediol divinyl ether or 1,4-butanediol divinyl ether; and optionally additives, such as promoters.

The unsaturated resin compositions in accordance with the invention can be used as such and they are curable at room temperatures by suitable promoter-catalyst systems known in the art.

The obtained resin compositions are well suited for applications where good mechanical properties are required. They show a remarkable benefit in solubility, in applicability and in the properties of the finished cured products. They may be used as such or together with reinforcing agents, filled or unfilled to produce composites, moulds, moulded parts, laminates of 2–20 mm thickness and coatings with a thickness of 200–2000 µm, typically 400–1000 µm for various conventional applications. The resin compositions in accordance with the invention may also be formulated together with suitable additives known in the art to form gelcoats, laminates and polyester products. Surprisingly even thick coatings, products and gelcoats comprising the composition according to the invention can be conveniently cured at room temperature using conventional radical curing. Additionally, in the compositions according to the invention, the molar ratio of divinyl ethers with respect to starting materials in the polyesters can be varied because of high degree of crosslinking.

Gelcoats are curable compositions, which comprise at least one of the above polyester resin compositions and additives. Suitable additives include pigments, fillers, promoters, co-promoters, thixotropic agents, thixotropy enhancers, suppressants, air release agents, surface tension agents, wetting agents, levelling agents and catalysts.

Preferably, the following additives are used for gelcoats according to the invention;

0.1–0.5 wt-% of a metal promoter, preferably such cobalt, manganese, iron, vanadium, copper or aluminium salt of an organic acid, such as octanoic acid or naphthoic acid;

0.1–0.5 wt-% of an amine promoter, such as dimethylaniline, diethylaniline, 2-aminopyridine, N,N-dimethyl acetoacetamide, acetoacetanilide or other organic compounds, such as ethyl acetoacetate, methyl acetoacetate, N,N-dimethyl-p-toluidine, or N,N-dimethyl-o-toluidine;

not more than 10 wt-%, preferably not more than 6 wt-%, of a copromoter, preferably acetoacetoxy ethyl methacrylate or acrylate or $C_1-C_8$ linear or branched alkyl acetoacetate; and 0.5–3 wt-% of a peroxide catalyst to initiate the polymerization of the composition, preferably methyl ethyl ketone peroxide or benzoyl peroxide.

A typical gelcoat composition based on the unsaturated polyester resin composition in accordance with the invention comprises:

10–90% Unsaturated polyester resin composition

1–20% Pigments

1–40% Fillers

0–10% Silica 0.5–3% Peroxide type catalyst for initiating the polymerisation of the composition 0.1–5% Promoters.

The following examples enable a better understanding of the invention. Examples of unsaturated polyesters which are suitable for use together with vinyl ethers, examples of resin compositions and examples of formulations of divinyl ether containing gelcoats are included. The examples are not intended to limit the scope of the invention.

EXAMPLE 1

Preparation of Polyester A 35 mol-% of phthalic anhydride, 15 mol-% of benzoic acid and 15 mol-% of tri-methylol propane are esterified in a condensation reactor at 190–210° C. During the reaction, the generated water is removed by a nitrogen purge through a separation column. When the acid value of 30–35 is reached, the temperature in the reactor is dropped to 120° C. 35 mol-% of glycidyl methacrylate is added slowly into the reactor. After the addition, heating is continued for additional 1–2 h. The obtained product has a cone and plate viscosity (I.C.I.) of 6.0 P at 100° C., an acid value of 2.8 and a Mw of 1500.

EXAMPLE 2

Preparation of Polyester B 40 mol-% of maleic anhydride, 25 mol-% of 2-methyl-1,3-propanediol and 25 mol-% of benzyl alcohol are esterified in a condensation reactor at 190–220° C. During the reaction, the generated water is removed by a nitrogen purge through a separation column. The esterification is driven to an acid value of below 65, preferably to acid value of 45, and 10 mol-% of glycidyl methacrylate is added to the reaction mixture at 120° C. The obtained modified resin has a cone and plate viscosity (I.C.I.) of 11.0 P at 50° C., an acid value of 11 and a Mw of 1200.

EXAMPLE 3

Preparation of Polyester C 40 mol-% of maleic anhydride, 20 mol-% of dipropylene glycol, 20 mol-% of benzyl alcohol and 20 mol-% of 2-ethylhexanol are esterified in a condensation reactor at 190–220° C. During the reaction, the generated water is removed by a nitrogen purge through a separation column. The esterification is completed by applying a vacuum (200 mbar) in the reactor. The obtained product has a cone and plate viscosity (I.C.I.) of 4.0 P at 25° C., an acid value of 17 and a Mw of 800.

EXAMPLE 4

Preparation of Polyester D 22 mol-% of maleic anhydride, 11 mol-% of phthalic anhydride, 11 mol-% of terephthalic anhydride, 21 mol-% of ethylene glycol, 13 mol-% of diethylene glycol and 22 mol-% of ethylhexanol are esterified in a condensation reactor at 190–220° C. During the reaction, the generated water is removed by a nitrogen purge through a separation column. The esterification is completed by applying a vacuum (200 mbar) in the reactor. The obtained product has a cone and plate viscosity (I.C.I.) of 11.0 P at 50° C., an acid value of 21 and a Mw of 1300.

EXAMPLE 5

Preparation of Polyester E 29 mol-% of maleic anhydride, 16 mol-% of isophthalic acid, 20 mol-% of propylene glycol, 20 mol-% of diethylene glycol, 10 mol-% of ethylene glycol and 5 mol-% of benzyl alcohol are esterified in a condensation reactor at 190–220° C. During the reaction, the generated water is removed by a nitrogen purge through a separation column. The esterification is completed by applying a vacuum (200 mbar) in the reactor. The obtained product has a cone and plate viscosity (I.C.I) of 3.0 P at 125° C., an acid value of 10 and a Mw of 2300.

EXAMPLE 6

Preparation of Polyester F 28 mol-% of maleic anhydride, 21 mol-% of terephthalic acid and 51 mol-% of 2-methyl-1,3-propanediol are esterified in a condensation reactor at 190–220° C. During the reaction, the generated water is removed by a nitrogen purge through a separation column. The obtained product has a cone and plate viscosity (I.C.I.) of 8.8 P at 125° C., an acid value of 36 and a Mw of 3600.

EXAMPLE 7

Unsaturated Polyester Composition 1 Containing Divinyl Ether but no Styrene

Percentages by weight:

25% polyester A
27% polyester B
20% polyester C
5% polyester D
22% triethyleneglycol divinyl ether
1% promoters.

The Brookfield viscosity of the polyester composition prepared above is 710 cP. 2% of methyl ethyl ketone peroxide (MEKP) is added to cure the composition. Gel time is 20 min and peak exotherm 105° C. DSC analysis shows no remarkable residual reactivity after curing at room temperature. The mechanical properties of the cured casting are as follows: Tensile strength 29 MPa, tensile elongation 1.6% and heat distortion temperature 88° C. The mechanical properties of glass reinforced laminate are as follows: Tensile strength 81 MPa and tensile elongation 2%.

EXAMPLE 8

Unsaturated Polyester Composition 2 Containing Divinyl Ether

Curing of the composition is performed as described in Example 7.

Percentages by weight:

25% polyester F
30% polyester B
10% triethylene glycol divinyl ether
20% styrene
1% promoters.

EXAMPLE 9

Unsaturated Polyester Composition 3 Containing Divinyl Ether

Curing of the composition is performed as described in example 7.

Percentages by weight:

38% polyester E
30% polyester B
5% polyester D
10% triethylene glycol divinyl ether
17% styrene
1% promoters.

EXAMPLE 10

Preparation of divinyl ether based gelcoats from resin compositions 1, 2 and 3

| Constituent (weight %) | Gelcoat A | Gelcoat B | Gelcoat C |
|---|---|---|---|
| Resin composition: | Composition 1 (Example 8) | Composition 2 (Example 9) | Composition 3 (Example 10) |
| Resin | 50 | 50 | 51 |
| Pigment | 15 | 15 | 18 |
| Filler | 12 | 12 | 15 |
| Silica | 4 | 4 | 1 |
| Triethyleneglycol divinyl ether | 15.1 | 4 | 5 |
| Ethyleneglycol dimethacrylate | 3.9 | 0 | 5 |
| Styrene | 0 | 15 | 5 |
| Properties of the gelcoats A–C | | | |
| Cone and plate viscosity (I.C.I.)/P | 4.0 | 4.8 | 3.8 |
| Brookfield viscosity (10 rpm)/cP | 5320 | 9600 | 2140 |
| Color/calib white L | −4.69 | −3.94 | −4.85/−4.67 |
| Gloss 20° coating thickness* 800/1000 μm | 70/63 | 88/88 | 71/66 |
| Gloss 60° coating thickness* 800/1000 μm | 88/86 | 94/94 | 87/88 |

* = coating thickness 800 or 1000 μm after application and coating thickness 600 or 900 μm after drying.

What is claimed is:

1. A room temperature radical curable unsaturated polyester resin composition, which comprises:

50–90 wt % of at least one normal unsaturated polyester and/or modified unsaturated polyester produced by allowing maleic acid, fumaric acid, maleic anhydride or derivatives or mixtures thereof, and methacrylic acid or acrylic acid in an amount of not more than 40 mol %, calculated from the amount of all the components for replacing maleic acid, fumaric acid, maleic anhydride or derivatives or mixtures thereof, to react with an alcohol/alcohols selected from 2-ethyl hexanol, benzyl alcohol, 2-phenylethyl alcohol, ethylene glycol, diethylene glycol, 1,2-propylene glycol, 1,3-propylene glycol, dipropylene glycol, 1,4-butane diol, 2-methyl-1,3-propane diol, neopentyl glycol, 2-butyl-2-ethyl-1,3-propane diol, 1,6-hexane diol, trimethylol propane and trimethylol ethane, and at most 80% of the alcohols may be replaced by glycidyl methacrylate and/or glycidyl acrylate;

0.1–40 wt% of at least one divinyl ether selected from diethylene glycol divinyl ether, triethylene glycol divinyl ether, 1,4-cylcohexane dimethylol divinyl ether, dipropylene glycol divinyl ether, tripropylene glycol divinyl ether, 1,6-hexanediol divinyl ether and 1,4-butanediol divinyl ether;

not more than 30 wt % styrene;

not more than 20 wt % of at least one monofunctional and/or multifunctional monomer; and optionally additives.

2. The unsaturated polyester resin composition according to claim 1, characterized in that the composition comprises 58–80 wt-% of at least one normal unsaturated polyester and/or one modified unsaturated polyester, 5–40 wt-% of at least one divinyl ether, not more than 20 wt-% of styrene and not more than 15 wt-% of at least one monofunctional and/or one multifunctional monomer.

3. The unsaturated polyester resin composition according to claim 1 or 2, characterized in that composition comprises two to four normal unsaturated polyesters and/or modified unsaturated polyesters.

4. The unsaturated polyester resin composition according to claim 1, characterized in that the monofunctional and/or multifunctional monomer is selected from methyl methacrylate, butyl acrylate, ethylhexyl acrylate, hydroxypropyl methacrylate, lauryl acrylate, stearyl methacrylate, lauryl methacrylate, butanediol diacrylate, ethyleneglycol dimethacrylate, diethyleneglycol dimethacrylate, triethyleneglycol dimethacrylate, dipropyleneglycol dimethacrylate, tripropyleneglycol dimethacrylate or trimethylol propane triacrylate, pentaerythritol 3-acrylate, pentaerythritol tetra-acrylate, divinyl benzene, α-methyl styrene, o-methyl styrene and p-methyl styrene.

5. The unsaturated polyester resin composition according to claim 1, characterized in that at 60 mol-% of the alcohol/alcohols are replaced by glycidyl methacrylate and/or glycidyl acrylate, and methacrylic acid or acrylic acid may be used in an amount of not more than 30 mol-% calculated from the amount of all components, for replacing maleic acid, fumaric acid, maleic anhydride or derivatives or mixtures thereof.

6. A method of preparing composites, coatings, laminates, gelcoats, moulds and moulded parts, by using the unsaturated polyester resin composition according to claim 1 with reinforcing agents—filled or unfilled.

7. The method according to claim 6, wherein the coatings are of 200–2000 μm thickness and the laminates are of 2–20 mm thickness.

8. A method for the manufacture of an unsaturated polyester resin composition, characterized in that the composition is formed by compounding 50–90 wt-% of at least one normal unsaturated polyester and/or modified unsaturated polyester prepared by cooking until an acid value of 5–65 is reached, and removing excess water during the reaction, from maleic acid, fumaric acid, maleic anhydride or a derivative or mixtures thereof, and methacrylic acid or acrylic acid may be used in an amount of not more than 40 mol-% calculated from the amount of all components, for replacing maleic acid, fumaric acid, maleic anhydride or derivatives or mixtures thereof; and/or other acids selected from benzoic acid, phthalic acid, phthalic anhydride, isophthalic acid, terephthalic acid, terephthalic anhydride, adipic acid, 1,2-cyclohexyl dicarboxylic acid and 1,4-cyclohexyl dicarboxylic acid; and alcohols selected from 2-ethyl hexanol, benzyl alcohol, 2-phenylethyl alcohol, ethylene glycol, diethylene glycol, 1,2-propylene glycol, 1,3-propylene glycol, dipropylene glycol, 1,4-butane diol, 2-methyl-1,3-propane diol, neopentyl glycol, 2-butyl-2-ethyl-1,3-propane diol, 1,6-hexane diol, trimethylol propane and trimethylol ethane, and at most 80 mol-% of the alcohols may be replaced by glycidyl methacrylate and/or glycidyl acrylate;

0.1–40 wt-% of at least one divinyl ether selected from diethylene glycol divinyl ether, triethylene glycol divinyl ether, 1,4-cyclohexane dimethylol divinyl ether, dipropylene glycol divinyl ether, tripropylene glycol divinyl ether, 1,6-hexanediol divinyl ether and 1,4-butanediol divinyl ether;

not more than 30 wt-% of styrene;

not more than 20 wt-% by weight of at least one monofunctional and/or multifunctional monomer; and optionally additives.

9. The method for the manufacture of an unsaturated polyester resin composition according to claim 8, characterized in that 58–80 wt-% of at least one unsaturated polyester and/or one modified unsaturated polyester, 5–40 wt-% of at least one divinyl ether, not more than 20 wt-% of styrene and not more than 15 wt-% of at least one monofunctional and/or one multifunctional monomer are used in the method.

10. The method for the manufacture of an unsaturated polyester resin composition according to claim 8 or 9, characterized in that two to four normal unsaturated polyesters and/or modified unsaturated polyesters are used.

11. The method for the manufacture of an unsaturated polyester resin composition according to claim 8, characterized in that the monofunctional and/or multifunctional monomer is selected from methyl methacrylate, butyl acrylate, ethylhexyl acrylate, hydroxypropyl methacrylate, lauryl acrylate, stearyl methacrylate, lauryl methacrylate, butanediol diacrylate, ethyleneglycol dimethacrylate, diethyleneglycol dimethacrylate, triethyleneglycol dimethacrylate, dipropyleneglycol dimethacrylate, tripropyleneglycol dimethacrylate or trimethylol propane triacrylate, pen,taerythritol 3-acrylate, pentaerythritol tetra-acrylate, divinyl benzene, α-methyl styrene, o-methyl styrene and p-methyl styrene.

12. The method for the manufacture of an unsaturated polyester resin composition according to claim 8, characterized in that not more than 60 mol-% of the alcohol/alcohols are replaced by glycidyl methacrylate and/or glycidyl acrylate, and methacrylic acid or acrylic acid may be used in an amount of not more than 30 mol-% calculated from the amount of all components, for replacing maleic acid, fumaric acid, maleic anhydride or derivatives or mixtures thereof.

13. A gelcoat composition, characterized in that it comprises 10–90 wt-% of at least one unsaturated polyester resin composition according to claim 1 or manufactured according to claim 8, 0.1–0.5 wt-% of a metal promoter, 0.1–0.5 wt-% of an amine promoter, not more than 10 wt-% of a copromoter, 0.5–3 wt-% of a peroxide catalyst and other additives selected from a group consisting of pigments, fillers, thixotropy agents, thixotropy enhancers, suppressants, air release agents, surface tension agents, wetting agents and levelling agents.

* * * * *